(12) United States Patent
Freitas et al.

(10) Patent No.: US 8,346,651 B2
(45) Date of Patent: Jan. 1, 2013

(54) METHOD AND SYSTEM FOR CONDUCTING COMPUTER-ASSISTED TRANSACTIONS

(75) Inventors: Frank Freitas, Berkeley, CA (US); John Comerford, San Francisco, CA (US); Jonathan Kellner, New York, NY (US)

(73) Assignee: Instinet, Inc., New York, NY (US)

( * ) Notice: Subject to any disclaimer, the term of this patent is extended or adjusted under 35 U.S.C. 154(b) by 998 days.

(21) Appl. No.: 12/367,924

(22) Filed: Feb. 9, 2009

(65) Prior Publication Data

US 2010/0205080 A1  Aug. 12, 2010

(51) Int. Cl.
*G06Q 40/00* (2012.01)
(52) U.S. Cl. ......................................................... 705/37
(58) Field of Classification Search ........................ None
See application file for complete search history.

(56) References Cited

U.S. PATENT DOCUMENTS

2002/0007338 A1* 1/2002 Do .................................. 705/37
2007/0055607 A1* 3/2007 Wunsch et al. ................. 705/37

FOREIGN PATENT DOCUMENTS

WO    2008/132420    11/2008

OTHER PUBLICATIONS

Chan, Ernest P. Quantitative Trading. Wiley Trading. Nov. 17, 2008. pp. 87-88.*
Foster, Dean P; Gervais, Simon & Ramaswamy, Krishna. The Benefits of Volume-Conditional Order-Crossing. SSRN. Feb. 12, 2007. pp. 1-39.*
Foster et al. "The Benefits of Volume-Conditional Order-Crossing." Feb. 12, 2007, available at SSRN: http://ssrn.com/abstract=924410.

* cited by examiner

*Primary Examiner* — Jason M Borlinghaus
(74) *Attorney, Agent, or Firm* — Stroock & Stroock & Lavan LLP

(57) ABSTRACT

A system and method may include a central security transaction-assisting machine receiving from at least a subset of a plurality of system participants initial orders to buy and sell a security; a processor of the machine matching at least a subset of the initial buy orders to at least a subset of the initial sell orders based at least on quantity; the processor forming an order block of at least a subset of the matched orders; responsive to a threshold volume of matching orders being reached, the central machine broadcasting a cross announcement to each of the plurality of participants, where the cross announcement indicates a beginning of a time window during which further matching orders to buy and sell quantities of the security are presentable for inclusion in the order block; and, at an end of the time window, executing the order block.

24 Claims, 7 Drawing Sheets

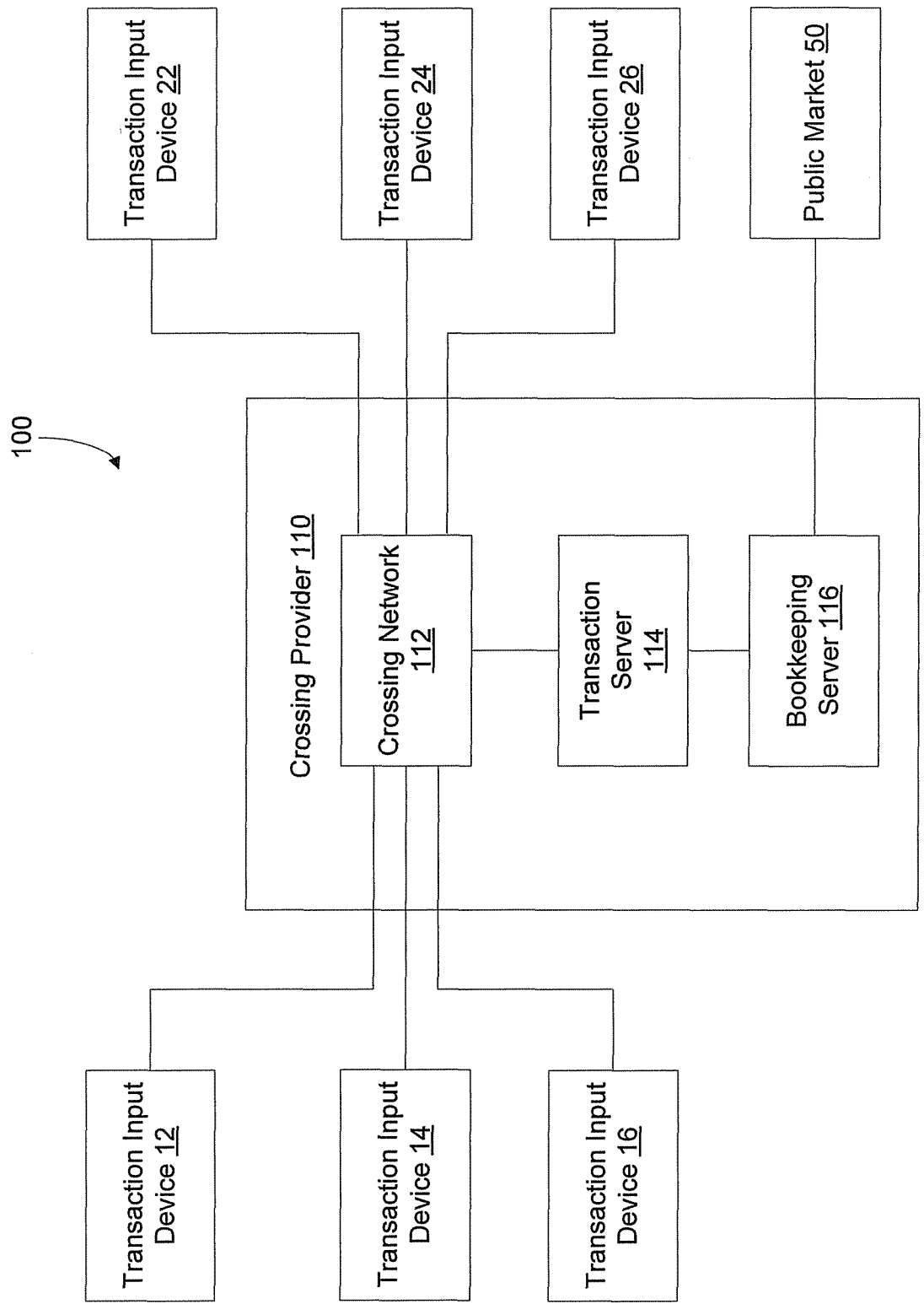

| Participant 60 | | Offer/Activity 62 | Results 66 |
|---|---|---|---|
| 30 | A | Buy 1,000 | Bought 1,000 |
| 31 | B | Buy 3,000 | Bought ,3000 |
| 32 | D | Sell 3,500 | Sold 2,700 |
| 33 | E | Sell 9,500 | Sold 7,300 |
| 34 | C | Buy 6,000 | Bought 6,000 |
| 35 | N/A | Volume trigger activated | |
| 36 | N/A | Capture NBBO midpoint | |
| 37 | N/A | Broadcast NOX | |
| 38 | D | Sell 800 (Residual) | Sold 300 |
| 39 | E | Sell 2,200 (Residual) | Sold 900 |
| 40 | F | Buy 5,000 | Bought 5,000 |
| 41 | G | Sell 10,000 | Sold 3,800 |

Fig. 4

| | Participant 60 | Offer/Activity 62 | Price ceiling/floor (per share) 64 | Result 66 |
|---|---|---|---|---|
| 42 | D | Sell 2,000 | N/A | Sold 2,000 |
| 43 | A | Buy 11,000 | N/A | Bought 10,000 |
| 44 | E | Sell 5,000 | $12 (floor) | Sold 5,000 |
| 45 | G | Sell 3,000 | $11 (floor) | Sold 3,000 |
| 46 | N/A | Volume trigger activated | | |
| 47 | N/A | Capture NBBO midpoint | | |
| 48 | N/A | Broadcast NOX | | |
| 49 | A | Buy 1,000 (Residual) | N/A | Bought 600 |
| 50 | D | Sell 2,000 | $10 (floor) | Sold 2,000 |
| 51 | H | Sell 5,000 | $13 (floor) | Unexecuted |
| 52 | B | Buy 6,000 | $11 (ceiling) | Bought 3,400 |
| 53 | I | Sell 2,000 | N/A | Sold 2,000 |

Fig. 5

METHOD AND SYSTEM FOR CONDUCTING COMPUTER-ASSISTED TRANSACTIONS

BACKGROUND INFORMATION

In the financial industry, a variety of venues exist which allow securities such as stocks, bonds and derivatives to be traded. Example conventional trading venues include stock exchanges, which include physical stock exchanges, e.g., the New York Stock Exchange, as well as electronic stock exchanges, e.g., NASDAQ. In addition to stock exchanges, a variety of alternative trading systems (ATSs) have been approved by the Securities and Exchange Commission (SEC) for conducting trades outside of conventional stock exchanges. Included among the ATSs are electronic communication networks (ECNs), which match buy orders with sell orders.

In most of the venues mentioned above, orders are publicly disseminated upon arrival, e.g., as stock quotes. Consequently, these venues have not been attractive to traders who wish to prevent the leakage of info into the market which could adversely impact execution quality.

Instead, some traders have turned to crossing networks, another form of ATS. Crossing networks provide a form of trading known as "dark pools," in which orders are not publicly disclosed. In a crossing network, complete anonymity may be provided since orders are never disclosed—even to other network subscribers. The only information disclosed about the orders is in the form of an execution message, e.g., a stock print, which occurs after the orders have been executed. Thus, no information is disclosed until after a trade has been completed. The stock print is made available to network subscribers, and also to the general public, e.g., via the Consolidated Tape System. Crossing networks may be analogized to a black box in which orders are placed; orders are revealed only after matching orders are successfully executed. In contrast, ECNs generally display unmatched orders externally, although the identity of the buyer/seller may remain hidden. Thus, crossing networks offer more anonymity than ECNs.

In an ideal crossing network, a high degree of liquidity exists because there is a readily available supply of buyers and sellers, and because the anonymity afforded results in minimal price fluctuation. In practice, crossing networks deviate from the ideal. One problem is that crossing networks are susceptible to manipulation, e.g., gaming. As an illustrative example, suppose a seller has just sold shares of a certain stock at a first venue. Based on this sale, the seller, suspecting that there may be a sudden demand for the stock, purchases additional shares from another venue and attempts to resell the additional shares for a profit at the first venue, thereby gaming the crossing network.

Another problem is the large number of crossing networks available. Because there are many crossing network venues, buyers and sellers are spread out and accomplishing trades of any appreciable size may involve trading on more than one crossing network. This reduces liquidity and lowers average trade size, which decreases while the average number of transactions required to trade large orders increases. Further, as the number of trades increases, so does the likelihood of becoming a victim of gaming, since trades become more visible. Further still, the dispersion of buyers and sellers may result in traders missing out on desirable trading opportunities, e.g., failure to meet at the right venue at the right time.

Accordingly, there exists a need for a more efficient method of conducting transactions.

SUMMARY

According to example embodiments of the present invention, a system for conducting computer-assisted transactions includes a central computer configured to: receive from at least a subset of a plurality of system participants, initial orders to buy and sell a security; match at least a subset of the initial buy orders to at least a subset of the initial sell orders based at least on quantity; form an order block of at least a subset of the matched orders; responsive to a threshold volume of matching orders being reached, broadcast a crossing announcement (interchangeably referred to herein as a notification of cross (NOX), an indication of cross (IOX), or a block cross (BLX) alert) to each of the plurality of participants, the NOX alert indicating a beginning of a time window during which further matching orders to buy and sell quantities of the security are presentable for inclusion in the order block; and at an end of the time window, execute the order block.

In an example embodiment of the present invention, the central computer is configured to execute the order block at a midpoint price of the National Best Bid and the National Best Offer (NBBO).

In an example embodiment of the present invention, the midpoint price is calculated from a value of the NBBO captured after the threshold volume is reached and before the NOX broadcast.

In an example embodiment of the present invention, the further matching orders are included in the order block only if the calculated midpoint price is within a range of the NBBO at any time during the time window.

In an example embodiment of the present invention, the central computer is configured to: for each of the matched initial sell orders, apportion to the matched initial sell order a percentage of the lesser of a total number of shares of the matched initial sell orders and a total number of shares of the matched initial buy orders, the percentage being approximately equal to a ratio of a number of shares of the matched initial sell order to the total number of shares of the matched initial sell orders; and for each of the matched initial buy orders, apportion to the matched initial buy order a percentage of the lesser of the total number of shares of the matched initial sell orders and the total number of shares of the matched initial buy orders, the percentage being approximately equal to a ratio of a number of shares of the matched initial buy order to the total number of shares of the matched initial buy orders.

In an example embodiment of the present invention, the central computer is configured to: for each of the matched further sell orders, apportion to the matched further sell order a percentage of the lesser of a total number of shares of the matched further sell orders and a total number of shares of the matched further buy orders, the percentage being approximately equal to a ratio of a number of shares of the matched further sell order to the total number of shares of the matched further sell orders; and for each of the matched further buy orders, apportion to the matched further buy orders a percentage of the lesser of the total number of shares of the matched further sell orders and the total number of shares of the matched further buy orders, the percentage being approximately equal to a ratio of a number of shares of the matched further buy order to the total number of shares of the matched further buy orders. Residual portions of the matched initial buy orders and the matched initial sell orders are treated as further buy orders and further sell orders, respectively.

In an example embodiment of the present invention, the threshold volume is determined as a function of an average daily volume (ADV) of the security.

In an example embodiment of the present invention, the threshold volume is a function of a twenty day ADV of the security.

In an example embodiment of the present invention, the threshold volume is determined as a function of a market capitalization status of the security.

In an example embodiment of the present invention, a length of the time window is less than ten seconds.

In an example embodiment of the present invention, a length of the time window ranges from two to ten seconds.

According to example embodiments of the present invention, a method of a security transaction-assisting machine includes a processor at a central computer: receiving from at least a subset of a plurality of system participants, initial orders to buy and sell a security; matching at least a subset of the initial buy orders to at least a subset of the initial sell orders based at least on quantity; and forming an order block of at least a subset of the matched orders. Responsive to a threshold volume of matching orders being reached, the central computer broadcasts a notification of cross (NOX) alert to each of the plurality of participants, the NOX alert indicating a beginning of a time window during which further matching orders to buy and sell quantities of the security are presentable for inclusion in the order block. The method further includes, at an end of the time window, executing the order block.

According to example embodiments of the present invention, a method of a security transaction-assisting machine includes, matching, by a processor at a central computer, received buy orders to received sell orders with regard to a security. The matched orders form an order block. The method further includes, responsive to a threshold volume of matched orders being reached, the central computer broadcasting a notification of cross (NOX) alert, the NOX alert indicating a beginning of a time window during which further matching orders to buy and sell quantities of the security are presentable for inclusion in the order block.

According to example embodiments of the present invention, a hardware-implemented computer-readable storage medium has, stored thereon, a series of instructions executable by a processor of a security transaction-assisting machine. The instructions, when executed, cause the processor to perform a method, including receiving from at least a subset of a plurality of system participants, initial orders to buy and sell a security; matching at least a subset of the initial buy orders to at least a subset of the initial sell orders based at least on quantity; and forming an order block of at least a subset of the matched orders. The method further includes, responsive to a threshold volume of matching orders being reached, broadcasting a notification of cross (NOX) alert to each of the plurality of participants, the NOX alert indicating a beginning of a time window during which further matching orders to buy and sell quantities of the security are presentable for inclusion in the order block, and at an end of the time window, executing the order block.

BRIEF DESCRIPTION OF THE DRAWINGS

FIG. 1 is a block diagram that shows a system for conducting computer-assisted transactions according to an example embodiment of the present invention.

FIG. 4 shows a first set of transactions according to an example embodiment of the present invention.

FIG. 5 shows a second set of transactions according to an example embodiment of the present invention.

DETAILED DESCRIPTION OF EXAMPLE EMBODIMENTS

Figure 2A:
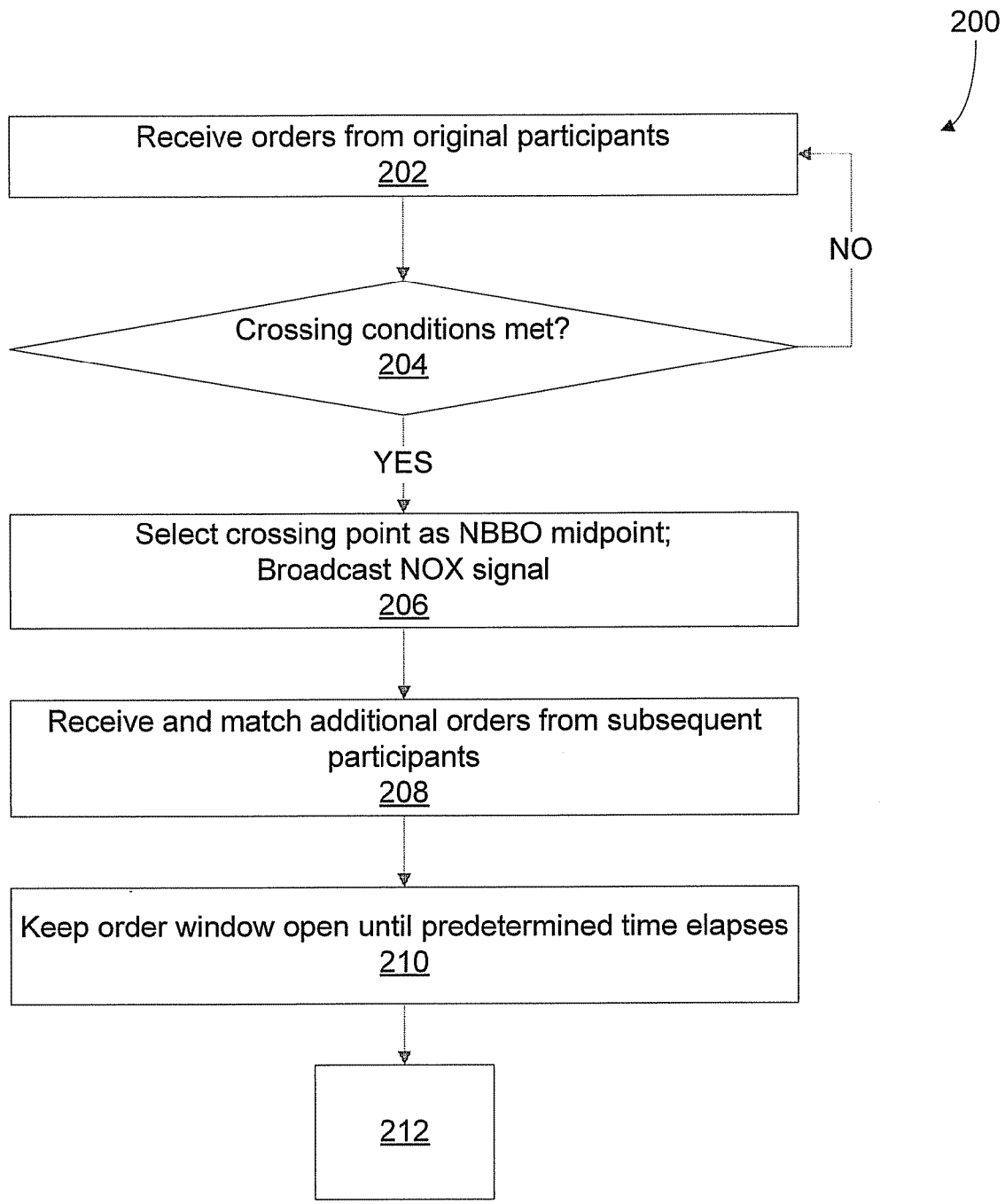
FIGS. 2a and 2b are flowcharts that show a method for conducting computer-assisted transactions according to an example embodiment of the present invention.

The present invention relates to methods and systems for conducting computer-assisted transactions. Exemplary embodiments of the present invention relate to methods and systems for conducting sales of securities, such as stocks, bonds and derivatives, in which a centrally located computer functions as an intermediary between a plurality of transaction participants, i.e., buyers and sellers. In an example embodiment, participants only include buy side users such as hedge funds, mutual funds and pensions, as well as individual investors. However, in an alternative embodiment, participants may also include sell side participants such as brokers. The central computer attempts to match buyers to sellers. When a sufficient volume of a particular security is available for crossing, the central computer invites additional orders in order to build on an existing order block before crossing all matching orders in that block. The order block is then executed as a single transaction under which the individual participants comprising the order block are hidden. As a result, average trade size is increased, the likelihood of gaming is reduced, and participants are enticed to trade at a single venue rather than spreading trades over a plurality of venues. Exemplary embodiments of the present invention will be described in which orders are executed at a crossing point based on the National Best Bid and Offer (NBBO). However, any conventional method of determining a crossing point may be used.

FIG. 1 shows an example of a system 100 for conducting computer-assisted transactions according to an example embodiment of the present invention. The system 100 may include a crossing provider 110, a plurality of transaction input devices 12, 14, 16, 22, 24 and 26, and a public market 50. In an example embodiment, the crossing provider 110 is an independently owned crossing network provider. Examples of independently owned providers include Instinet, Investment Technology Group (ITG), Liquidnet, and Pipeline Trading Systems. The crossing provider 110 may include a crossing network 112, a transaction server 114 and a bookkeeping server 116.

The crossing network 112 may be operated as a dark pool in which participants are anonymous and executed transactions are only disclosed after the transaction has occurred to the public. The crossing network 112 may include an electronic communications network, such as a virtual private network or a secured local-area network. The crossing network 112 may be accessed in any variety of ways, including via an Internet connection, file-transfer protocol, a dial-in connection, a local connection, etc. In an example embodiment, access is obtained remotely through a plurality of terminals, e.g., the input devices 12/14/16/22/24/26, configured to connect to the crossing network via a web portal. In alternative embodiments, access may involve, e.g., a combination of remote access and local access. For example, in addition to remote terminal access, the crossing provider 110 may provide a trading facility in which are located terminals preconfigured to access the crossing network 112.

The transaction server 114 may be any computing device or combination of devices in communication with the crossing network 112 and configured to receive transaction orders from the input devices 12/14/16/22/24/26. The transaction server 114 may be a business server dedicated to supporting the crossing network 112. However, it will be appreciated that the transaction server 114 may also perform other functions. The transaction server 114 may be implemented in any combination of hardware and/or software, e.g., including a processor, a memory storing instructions and/or data, network interface arrangements, etc. The transaction server 114 may be configured to match orders to buy with orders to sell. As will be discussed in further detail below, the transaction server 114 may determine a match when an order to buy matches an order to sell in terms of price. The transaction server 114 may also be configured to execute matching orders by, for example, allocating shares from a seller to a buyer and arranging the transfer of money from the buyer to the seller. As will be described below, the system may provide for execution of matching orders conditional upon a determination that the orders' individual requirements are met, where matching orders are executed as part of a single order block. The transaction server 114 may store account information corresponding to participants subscribed to the crossing network 112. Account information may include, e.g., a user name and password, contact information, bank account information, and any other information needed for executing transactions.

The bookkeeping server 116 may be any computing device or combination of devices in communication with the transaction server 114. Although in the exemplary embodiment the bookkeeping server 116 has been shown as separate from the transaction server 114, alternative embodiments may feature a single computing device incorporating the functionality of both the transaction server 114 and the bookkeeping server 116. The bookkeeping server 116 may be configured to store and maintain records of executed transactions. Optionally, the bookkeeping server 116 may be configured to store and maintain records of un-executed transactions, e.g., rejected orders and unmatched orders. The records may be stored in a log located in a memory of the bookkeeping server 116. Alternatively, the bookkeeping server 116 may transmit the records for remote storage.

The input devices 12/14/16/22/24/26 may include any variety of electronic input devices, including mobile phones, personal computers, laptops and dedicated trading terminals, operated by participants. In an example embodiment, the input devices each include software, e.g., a client application or plug-in, which configures the input device to communicatively connect to the transaction server 114 via the crossing network 112. The software may be pre-loaded during device manufacture or installed after manufacture, e.g., by a participant. Each input device may only be operated by a single participant at a time, although the participants need not have ownership of the actual device, e.g., shared device access. Each participant may be identified to the transaction server 114 by inputting account information, e.g., the user name and password. If the participant is an authorized subscriber, then the participant is allowed to submit orders to the crossing network 112.

The public exchange 50 may include a stock market, e.g., a physical stock market such as the New York Stock Exchange or an electronic stock market such as NASDAQ. The public exchange 50 may communicate with the bookkeeping server 116 to convey and receive information including the NBBO, which is an indicator of the best available purchase price (high bid) and best available selling price (lowest offer) of a given security. The NBBO is derived from transaction information received in substantially real time from all SEC authorized public trading venues, including stock markets and ATSs, e.g., the crossing network 112.

Several exemplary embodiments of methods for conducting computer-assisted transactions according to the present invention are described herein. The methods may be implemented in hardware, software, or a combination thereof, and are described with reference to the example system 100 of FIG. 1. In particular, the methods may be implemented at a processor of the transaction server 114 and executed as instructions contained in a computer-readable medium such as a computer memory, a hard drive, a CD-ROM, a portable flash memory, etc. However, the methods may also be successfully implemented in other systems according to the present invention.

Figure 2B:
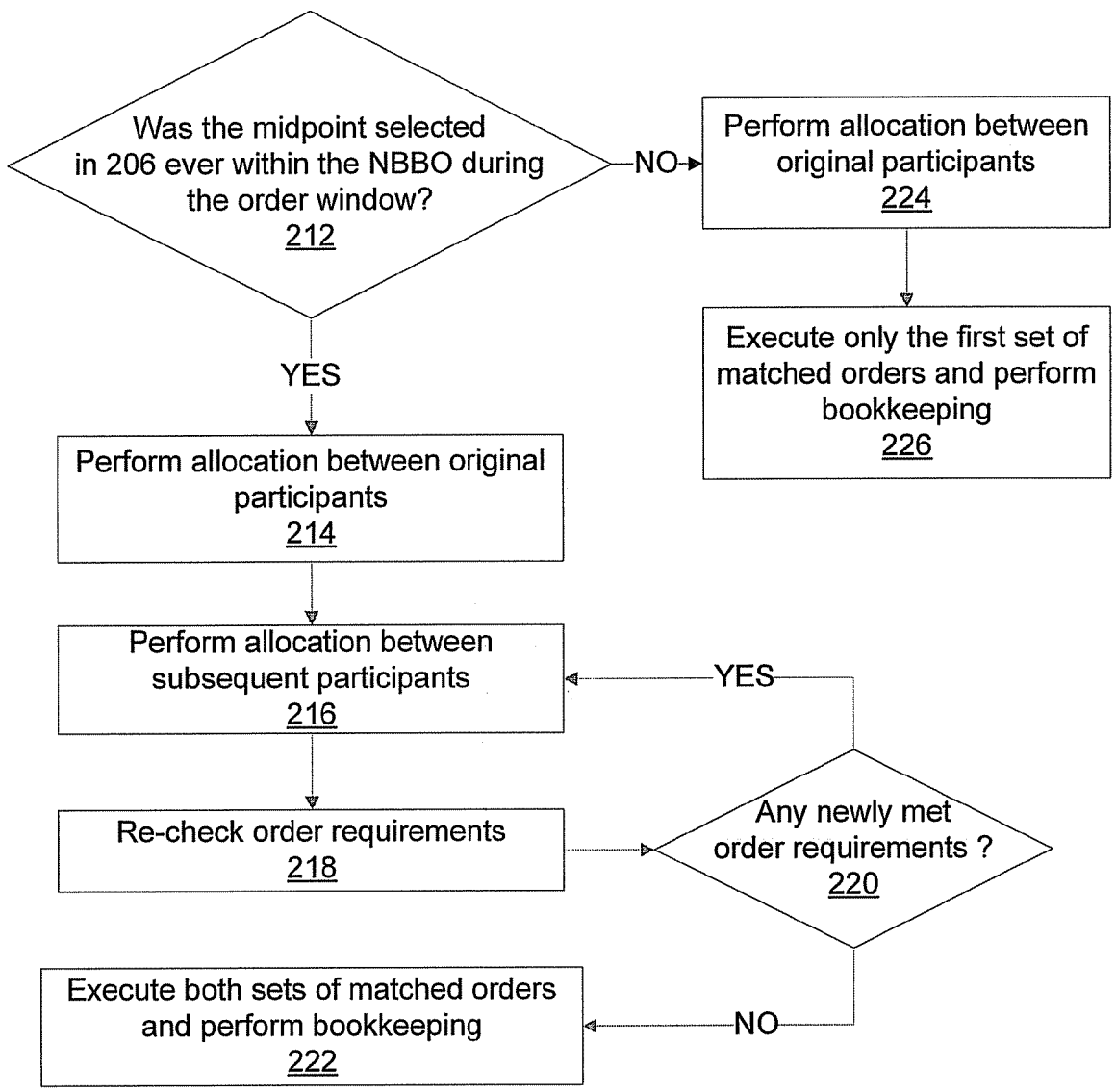

FIGS. 2a and 2b show an example of a method 200 for conducting computer-assisted transactions according to an example embodiment of the present invention. In an example embodiment, the method 200 begins at 202, where orders from a set of original participants may be received, e.g., at the transaction server 114. Orders may be recorded internally in an order book maintained by the crossing provider 110. The order book is private and generally will not be shared with anyone outside of the provider 110. The price (if any) and quantity specified by the orderer may be recorded along with any additional orderer-specified requirements. For example, limit orders, market orders, and reference priced orders (i.e., midpoint pegged) may be accepted.

Figure 3:
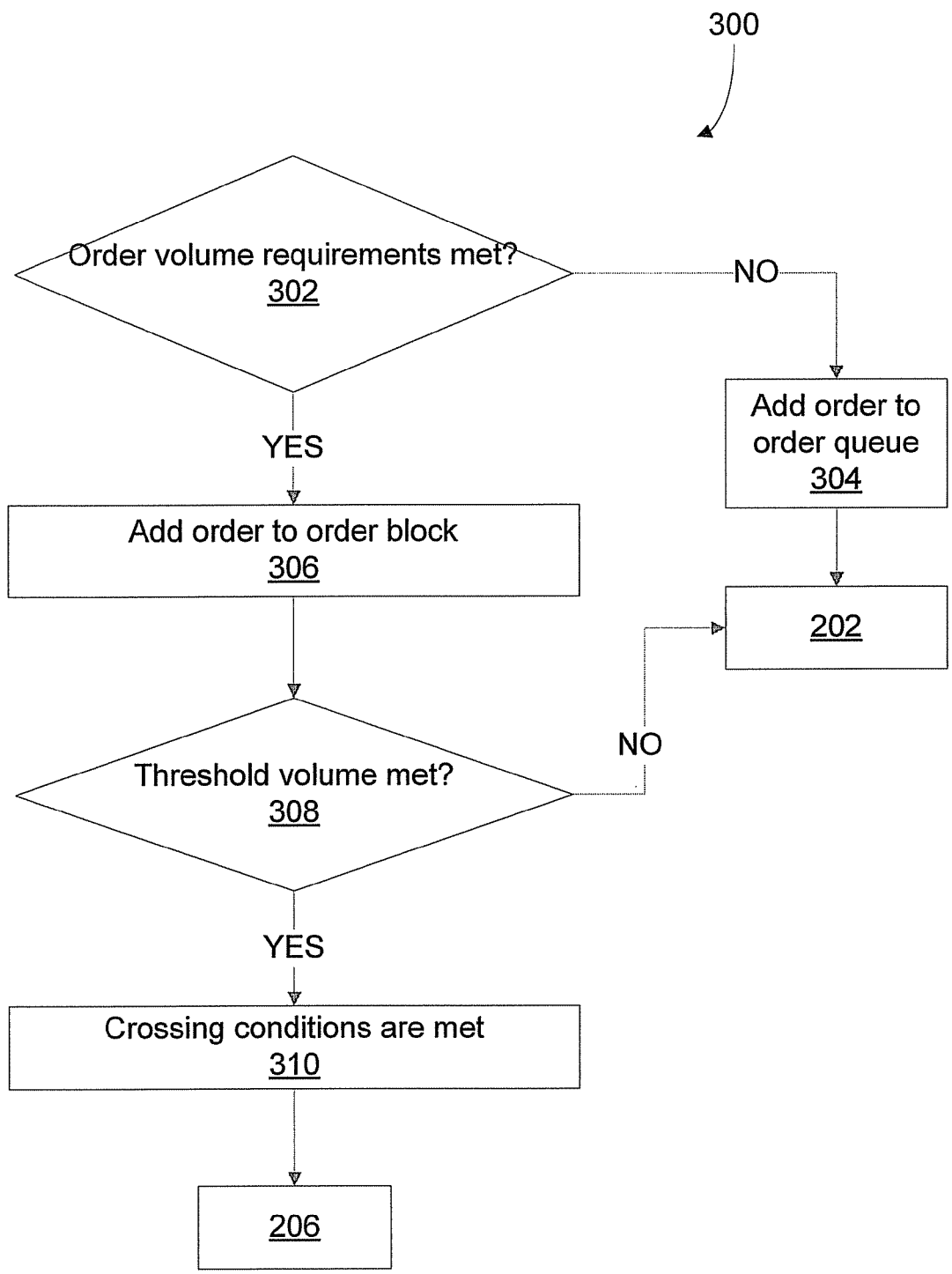
FIG. 3 is a flowchart that shows another method for conducting computer-assisted transactions according to an example embodiment of the present invention.

At 204, whether crossing conditions are met may be determined. Step 204 may be performed whenever a match is found. Referring to FIG. 3, an exemplary method 300 for determining crossing conditions is shown. In an example embodiment, the method 300 begins at 302.

At 302, it may be determined whether a new order's general requirements are met, that is, whether the order matches another order in terms of quantity. In contrast, in a public exchange, cases in which a match is considered to have occurred may be limited to where an offer price exactly matches a bid price, e.g., an order to sell at $10 and an order to buy at $10. In the context of limit orders, a match may also occur when the price requirements of a buy order overlap with the price requirements of a sell order, e.g., an order to sell at no less than $10 and an order to buy at no more than $14. In the latter example, the transaction may be successfully executed anywhere between $10 and $14. Thus, the buyer generally sets a price ceiling while the seller generally sets a price floor. If the ceiling is greater than or equal to the floor, then the overlap between the two prices defines a range in which the transaction can be executed.

Therefore, according to exemplary embodiments of the present invention, orders are matched based only on order quantity requirements, i.e., order volume, unless otherwise specified by order requirements, e.g., a price ceiling or floor. It should be noted that matches need not exclusively involve new or previously unmatched orders. For example, order requirements may be met through partial quantity matches, that is, an offer amount need not be exactly the same as a bid amount. Any residual quantity may be carried over for subsequent matching. This may occur when, for example, an order specifies a larger quantity than any combination of initial matching orders can meet.

If the order's volume requirements are not met, then the method 300 proceeds to 304, where the order may be added to an order queue, i.e., aggregating the order with other unmatched orders. Orders may sit in the queue indefinitely until they are matched. After adding the order to the queue, the method 300 proceeds to 202 of FIG. 2*a*, where a new order is received.

If the order's volume requirements are met, then the method 300 proceeds to 306, where the order may be added to an existing order block for later execution. The method 300 then proceeds to 308.

In 308, it may be determined whether a threshold volume is met. The threshold volume may be a predetermined number or may be a function of an average daily value (ADV) of a security involved in the order. In an example embodiment, the threshold volume is a function of 20-day ADV. If an aggregate of all matching orders that involve the security total to at least the threshold volume, then the threshold volume is met. In an alternative embodiment, the threshold volume may be a function of a market capitalization status of the security. For example, large-cap securities may require a higher threshold volume, e.g., 10,000 shares, than small or mid-caps, e.g., 5,000 shares.

If the threshold volume is not met, then the method 300 proceeds to 202 of FIG. 2*a*, where a new order is received.

If the threshold volume is met, then the method 300 proceeds to 310, where the crossing conditions are determined to be fully met.

Returning to FIG. 2*a*, as indicated above, if the crossing conditions are not met, then the method 200 returns to 202, where additional orders may be received.

If the crossing conditions are met, then the method 200 proceeds to 206, where, in response to the determination of the meeting of the crossing conditions, a crossing point is selected to be the NBBO midpoint and an NOX alert is broadcast, e.g., immediately, to all participants currently connected to the crossing network 112, e.g., to any input device connected to the crossing network 112. The NOX alert indicates that the crossing provider 110 would like to cross the current matched orders, and is an invitation to the participants to submit additional orders in an effort to build the existing order block. Thus, participants interested in trading the same security may take part in a single order as opposed to executing multiple, smaller transactions.

It should be noted that the value of the NBBO need not be taken at the exact moment the threshold volume is triggered. In one embodiment (FIG. 6), the NBBO value may be taken anywhere within a certain time window prior to broadcasting the NOX. For example, the NBBO value may be chosen randomly within a ten second pricing window before the NOX is broadcast. However, any NBBO value prior to actual order execution may be taken.

In 208, additional orders from subsequent participants may be received and matched to preexisting and other subsequent orders. The subsequent participants may include new participants as well as any of the original participants. During the time that the additional orders are received, e.g., an order window that corresponds to a period of time beginning after the NOX broadcast, orders involving other securities may also be received, but are not added to the existing order queue, e.g., a separate queue may be formed for each security. It should be noted, however that orders for securities other than the one involved in the existing order queue may trigger additional crosses, e.g., if the orders meet the other securities' respective threshold volumes.

In 210, the order window may be kept open until a predetermined time elapses. In an exemplary embodiment, the order window length may be ten seconds or less. In one embodiment, the length may be anywhere between two and ten seconds, inclusive. However, it will be understood that the order window may vary depending on any number of factors including, but not limited to, transmission time between the transaction server 114 and the input devices 12/14/16/22/24/26, response time of the transaction server 114, and latency in the crossing network 112. The length may be limited to an amount of time sufficient for an automated participant response, e.g., from a preconfigured transaction input device, or for a quick manual response. It may also be preferable that the length be short enough to limit the likelihood of manipulation by participants, e.g., attempts to inform non-participants about the order block, collusion between participants, or gaming. The length may be fixed, e.g., the same for all crosses. Alternatively, the length may be adjusted, e.g., dynamically, in response to changes in factors such as the ones discussed above. The method 200 then proceeds to 212, as shown in FIG. 2*b*.

Referring to FIG. 2*b*, in 212, it may be determined whether the midpoint value selected in 206 is ever within the NBBO range during the order window (e.g., within ten seconds after the NOX broadcast). That is, as the NBBO changes in value during the course of any given pricing window, there should be at least one instant in which the selected midpoint value is within the range of the NBBO during that period. This may enable all the orders in the order block (which includes the matched initial and the matched additional orders) to be executed at the selected midpoint value while complying with Federal regulations, e.g., the SEC's Regulation NMS. This is because Regulation NMS prohibits printing outside the NBBO, so that if the additional orders are to be executed at the same price as the initial orders, that price must fall within the NBBO sometime during when the additional orders are received. It should be noted, however, that this determination is only necessary if all the matched orders are to be executed at the same price.

In an alternative embodiment, the matched orders may be executed at different prices, e.g., at different NBBO midpoint values. The midpoint value for the matched initial orders may be based, e.g., on an NBBO value taken prior to the NOX broadcast, while the midpoint value for the matched additional orders may be based on an NBBO value taken subsequent to the NOX broadcast. Because the matched initial orders and the matched additional orders are crossed based on separate NBBO values, they may be executed at different prices without violating Regulation NMS. Thus, the determination in 212 may not be needed in this alternative embodiment.

If the selected midpoint value is within the NBBO range, then the method proceeds to 214, where an allocation may be performed between the original participants. Allocation may involve apportioning a total number of available shares of the security in the platform amongst the original participants. In an example embodiment, the original participants may be apportioned a pro rated amount as a function of each participant's relative contribution to the total available shares contained in the matched initial orders. As an illustrative example, when the demand (e.g., buying interest) exceeds the total number of shares available for purchase, each buyer may receive a portion of the total available shares such that the buyer's portion is equal to the ratio of the number of shares the buyer offered to buy relative to the total number of shares offered for purchase in the matched initial orders. Similarly, when the supply (e.g., selling interest) exceeds the total number of shares bought, each seller may receive a right to sell a portion of the total number of shares purchased such that the seller's portion is equal to the ratio of the number of shares the seller offered to sell relative to the total number of shares offered for sale in the matched initial orders.

In 216, an allocation may be performed between the subsequent participants, e.g., those who joined subsequent to the broadcast of the NOX, in a manner similar to the allocation between the original participants. That is, buyers may receive a right to purchase a portion equal to the ratio of the number of shares the buyer offered to buy relative to the total number of shares offered for purchase in the matched additional orders, while sellers may receive a right to sell a portion equal to the ratio of the number of shares the seller offered to sell relative to the total number of shares offered for sale in the matched additional orders. It is noted that a single participant may be considered both an original participant and a subsequent participant if the participant entered multiple orders at different times, e.g., before and after the NOX broadcast. This may also occur with residual orders.

Because allocation is performed between the original participants prior to allocation between the subsequent participants, the original participants are guaranteed their relative share of the order block over the subsequent participants. Subsequent participants may then receive their relative share of the remainder of the order block. As indicated above, original participants who are also subsequent participants may be treated the same as any other subsequent participant in 216. Further, if any partial-quantity matched, e.g., residual, orders from the original participants carry over into the matched additional orders, the unmatched portions of the matched initial orders may be treated the same as the additional orders.

It should be noted that the allocation between the original participants may be performed anytime after the NBBO value is taken. Thus, in an alternative embodiment, the allocation between the original participants may occur prior to broadcasting the NOX.

In 218, requirements of each order in the order queue may be re-checked to ensure that each order's requirements are met, e.g., if not already met. This allows for the possibility of order requirements based on total volume or participation. For example, participants may specify that they do not wish to take part if their order represents more than a certain percentage of the total volume, e.g., 10% of the final print. Participants may also specify whether they wish to be the only party on one side, e.g., "participate—don't initiate," or whether there needs to be multiple parties on an opposing side. It may occur that such order requirements are not initially met, but are satisfied when the additional orders are later added. As an illustrative example, a requirement that the seller does not represent more than 10% of the final print is not initially met if the seller is the only seller. However, as additional orders are presented, the seller's portion of the total volume may drop below 10%, thus satisfying the order requirements. After the orders are re-checked, any orders whose requirements are not met may be removed from the order queue.

In 220, it may be determined whether there are any newly met order requirements based on a result of the rechecking in 218. If there are newly met order requirements, then the method 200 returns to 216 where allocation is performed amongst the subsequent participants, whom now include the orderers of the order(s) with the newly met requirements. If there are no newly met order requirements, then the method 200 proceeds to 222.

In 222, transactions corresponding to the apportioned shares of each matched order are executed by crossing each transaction at the midpoint of the value of the NBBO that was taken in 206. This applies to both the original participants and the subsequent participants. Thus, all shares will buy and sell at the midpoint regardless of the ask/bid spread, if any, between matching orders. Further, the execution is fair to all participants, since the entire order block is executed at the same price, namely, the NBBO midpoint.

The transactions may be executed as a single order block. The order block may be broadcast within the crossing network 112 in a manner similar to that of a public print, e.g., by displaying the name or symbol of security, the total number of shares in the order block, and a time of execution. Because the matched initial orders and the matched additional orders occur at separate times, two prints may occur although the orders are treated as a single block. As with conventional crossing networks, the general public may be able to view the prints. Bookkeeping may be performed by adjusting participants' account balances to reflect the executed transactions. Commissions may be collected by the crossing provider 110 as a function of the total cost of each transaction, e.g., the crossing provider 110 may receive a fixed percentage of each transaction. Alternatively, a flat-rate commission may be levied. The original participants may be charged a lower commission than the subsequent participants as an incentive for future participants to initiate trading.

If the selected midpoint was never within the NBBO range during the order window, then the method 200 proceeds to 224, where an allocation may be performed between the original participants, e.g., in the manner described above in 214. The method 200 then proceeds to 226, where only the matched initial orders are executed as part of the order block before performing bookkeeping.

FIGS. 4 and 5 show examples of transactions according to example embodiments of the present invention. In FIG. 4, a table is shown which includes a participant column 60, an offer or activity column 62, and a result column 66. For illustration purposes, securities of only one company are involved in the orders shown in FIGS. 4 and 5 and the threshold volume is 10,000 shares.

In row 30, participant A offers to buy 1,000 shares. The buy order is queued.

In row 31, participant B offers to buy 3,000 shares. The buy order is queued.

In row 32, participant D offers to sell 3,500 shares. The sell order is matched to the buy orders in 30 and 31, and the orders in 30 to 32 are added to the order block.

In row 33, participant E offers to sell 9,500 shares. The sell order is matched to the buy orders in 30 and 31 and added to the order block, since 500 shares remain to be bought.

In row 34, participant C offers to buy 6,000 shares. The buy order is matched to the sell orders in 32 and 33 and added to the order block.

In row 35, a volume trigger is activated, since the threshold volume is reached (at least 10,000 shares have been matched). Participants A, B, D, E, and C can now be considered the original participants.

In row 36, the NBBO midpoint is captured, e.g., randomly within a ten second window after the volume trigger is activated.

In row 37, an NOX is broadcast to all participants in the crossing network.

As previously mentioned, allocation between the original participants may occur anytime after the NBBO value is taken. Thus, the allocation between the original participants may be performed after the NOX broadcast, e.g., immediately prior to allocation between the subsequent participants. However, to facilitate discussion, and to illustrate how residual orders can carry over into the additional orders, results of an allocation between the original participants A, B, D, E, and C will now be discussed before proceeding.

A total of 10,000 shares are available for purchase in the orders of 30-34, based on a total demand of 10,000 and a total supply of 13,000. Thus, an excess supply of 3,000 will be carried over as residual sell orders. Participants A, B, and C each buy their full order amounts. Participant D sells 2,700, based on a pro rata ratio of 3,500/13,000. Participant E sells 7,300, based on a pro rata ratio of 9,500/13,000. The pro rated allocation may vary across implementations, e.g., based on how rounding or approximation is performed against fractional shares. In this instance, participant D will have a residual sell order of 800 and participant E will have a residual sell order of 2,200.

In row 38, participant D's residual sell order of 800 is grouped with the additional orders. This may be performed by, for example, adding D's residual order to the order queue.

In row 39, participant E's residual sell order of 2,200 is grouped with the additional orders, e.g., added to the order queue.

In row 40, participant F offers to buy 5,000. The buy order is matched to the residual sell orders in 38 and 39, and the orders in 38 to 40 are added to the order block.

In row 41, participant G offers to sell 10,000. The sell order is matched to the buy order in 40 and added to the order block. At this time, the order window closes so that participants D, E, F, and G are considered subsequent participants.

Allocation between the subsequent participants now follows. A total of 5,000 shares are available for purchase in the orders of 38-41, based on a total demand of 5,000 and a total supply of 13,000. Participant F buys 5,000. Participant D sells 300, based on a pro rata ratio of 800/13,000. Participant E sells 900, based on a pro rata ratio of 2,200/13,000. Participant G sells 3,800, based on a pro rata ratio of 10,000/13,000.

FIG. 5 shows an example of how the present invention can support limit orders. In FIG. 5, a table is shown which includes a participant column 60, an offer or activity column 62, a price ceiling/floor column 64, and a result column 66.

In row 42, participant D offers to sell 2,000 shares. The sell order is queued.

In row 43, participant A offers to buy 11,000 shares. The buy order is matched to the sell order in 42, and the orders in 42 and 43 are added to the order block.

In row 44, participant E offers to sell 5,000 shares. The sell order is a limit order specifying a floor of $12, is matched to the buy order in 43, and added to the order block.

In row 45, participant G offers to sell 3,000 shares. The sell order is a limit order specifying a floor of $11, is matched to the buy order in 43, and added to the order block.

In row 46, a volume trigger is activated, since the threshold volume is reached (at least 10,000 shares have been matched). Participants D, A, E, and G can now be considered the original participants.

In row 47, the NBBO midpoint is captured, e.g., randomly within a ten second window after the volume trigger is activated.

In row 48, an NOX is broadcast to all participants in the crossing network.

A total of 10,000 shares are available for purchase in the orders of 30-34, based on a total demand of 11,000 and a total supply of 10,000. Thus, an excess demand of 1,000 will be carried over as a residual buy order. Participant D sells his full order amount. Assuming that the price floors in 44 and 45 are at or below the NBBO midpoint, participants E and G also sell their full order amounts. Participant A buys 10,000 and has a residual buy order of 1,000.

In row 49, participant A's residual buy order of 1,000 is grouped with the additional orders, e.g. added to the order queue.

In row 50, participant D offers to sell 2,000. The sell order is a limit order specifying a floor of $10, is matched to the buy order in 49, and the orders in 49 and 50 are added to the order block.

In row 51, participant H offers to sell 5,000. The sell order is a limit order specifying a floor of $13. Assuming that participant H's price floor of $13 is above the NBBO midpoint determined in 47, H's sell order is queued rather than added to the order block. In this manner, it may be made available for subsequent matching and placement in a different order block.

In row 52, participant B offers to buy 6,000. The buy order is a limit order specifying a ceiling of $11, is matched to the sell order in 50, and added to the order block.

In row 53, participant I offers to sell 2,000. The sell order is matched to the buy orders in 49 and 52 and added to the order block. At this time, the order window closes so that participants A, D, H, B, and I are considered subsequent participants.

Allocation between the subsequent participants now follows. A total of 4,000 shares are available for purchase in the orders of 49-53, based on a total demand of 7,000 and a total supply of 4,000. Assuming that the price floor in 50 is at or below the NBBO midpoint, participant D sells his full order amount. Participant I also sells his full order amount. Participant A buys 600, based on a pro rata ratio of 1,000/7,000. Assuming that the price ceiling in 52 is at or above the NBBO midpoint, participant B buys 3,400, based on a pro rata ratio of 6,000/7,000.

Figure 6:
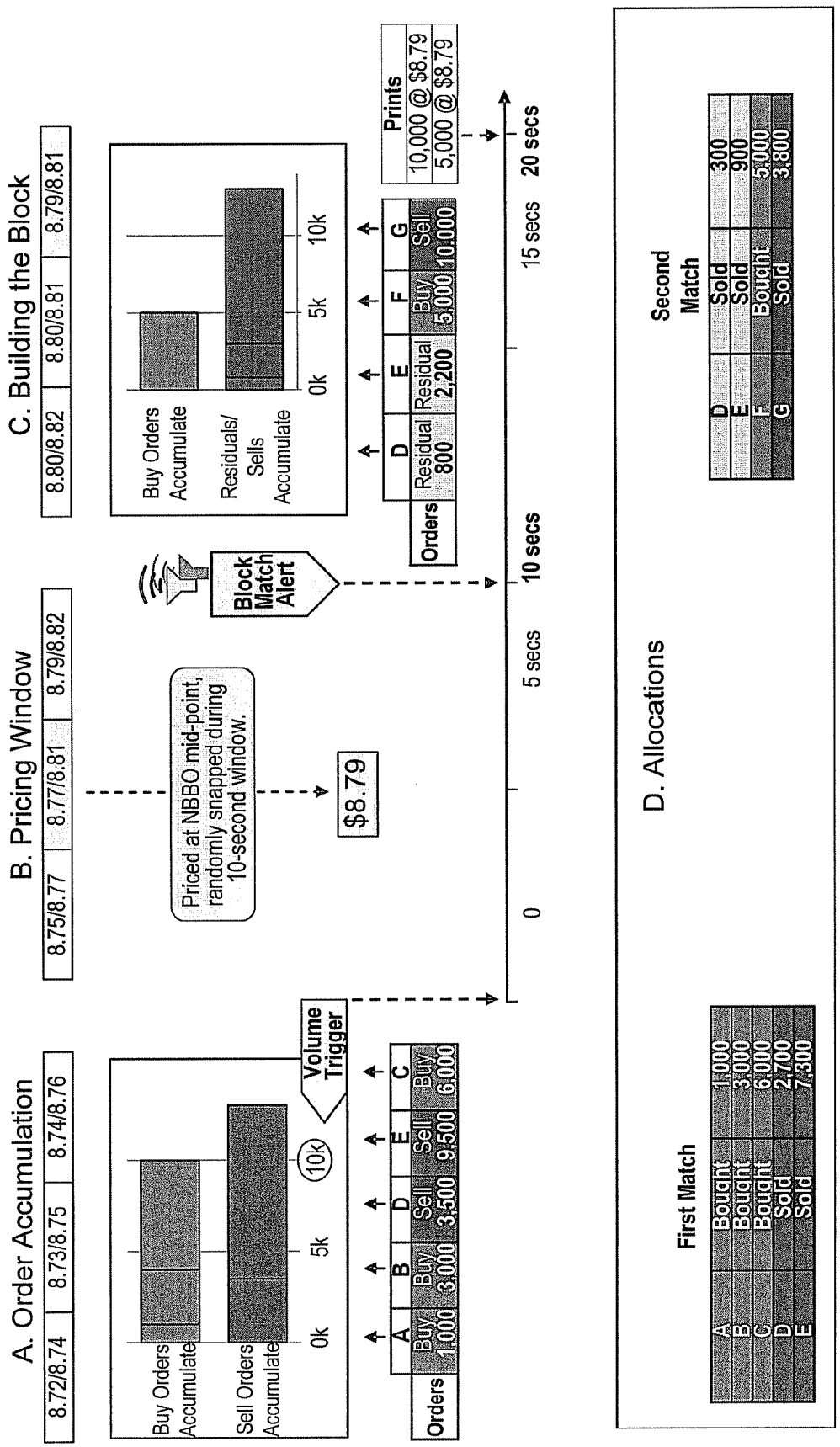
FIG. 6 shows a timeline for the transactions of FIG. 4 according to a example embodiment of the present invention.

FIG. 6 shows a timeline for the transactions described above with reference to FIG. 4. During an order accumulation phase, matched buy and sell orders accumulate until the threshold volume of 10,000 is reached on both sides, at which point the volume trigger is activated. During the order accumulation phase, the NBBO changes in value based on public information, starting with a bid/offer price of 8.72/8.74 and ending in a price of 8.74/8.76.

The volume trigger signals the beginning of a pricing window phase in which the NBBO value is chosen randomly within a ten second window. As shown in FIG. 6, the selected midpoint is based on a captured value of 8.77/8.81 and equals $8.79. At the end of the pricing window phase, an NOX (shown as a "Block match alert") is broadcast, signaling the beginning of a block building phase. The NBBO continues to change during the pricing window phase.

In the block building phase, matched additional orders are accumulated during a ten second order window. At the end of the order window, it is determined that the selected midpoint price of $8.79 was within the NBBO range at least once during the order window, since at one point during the order window, the NBBO value was 8.79/8.81. Following this determination, the matched initial orders, i.e., from the order accumulation phase, are executed with the matched additional orders from the block building phase. Two prints occur, listing volumes of 10,000 and 5,000 shares, both at the midpoint price of $8.79.

Allocation occurs in an allocation phase, which produces the same results shown in the allocation results column 66 of FIG. 4.

In the preceding specification, the present invention has been described with reference to specific example embodiments thereof. It will, however, be evident that various modifications and changes may be made thereunto without departing from the broader spirit and scope of the present invention as set forth in the claims that follow. The embodiments described herein may be presented combined with each other in various combinations. The specification and drawings are accordingly to be regarded in an illustrative rather than restrictive sense.

What is claimed is:

1. A method of a security transaction-assisting machine, comprising:
a processor at a central computer:
receiving from at least a subset of a plurality of system participants, initial orders to buy and sell a security;
matching at least a subset of the initial buy orders to at least a subset of the initial sell orders based at least on quantity, wherein an initial buy order of the at least the subset of the initial buy orders and an initial sell order of the at least the subset of the initial sell order are considered matched when there is at least a partial overlap between a quantity identified for sale by the initial sell order and the quantity identified for purchase by the initial buy order; and
forming an order block of at least a subset of the matched orders;
responsive to a threshold volume of matching orders being reached, the central computer broadcasting a notification of cross (NOX) alert to each of the plurality of participants, the NOX alert indicating a beginning of a time window during which further matching orders to buy and sell quantities of the security, which are considered matched when they include a further sell order and a further buy order identifying respectively a quantity identified for sale and a quantity identified for purchase that at least partially overlap, are presentable for inclusion in the order block; and
at an end of the time window, executing the order block.

2. The method of claim 1, wherein the order block is executed at the midpoint price of the National Best Bid and the National Best Offer (NBBO).

3. The method of claim 2, wherein the midpoint price is calculated from a value of the NBBO captured after the threshold volume is reached and before the NOX broadcast.

4. The method of claim 3, further comprising:
executing code by which the further matching orders are included in the order block in response to determining that the calculated midpoint price was within the NBBO at some time during the time window, and by which the further matching orders are excluded from the order block in response to determining that the calculated midpoint price was not within the NBBO at any time during the time window.

5. The method of claim 1, further comprising:
for each of the matched initial sell orders, the processor apportioning to the matched initial sell order a percentage of the lesser of a total number of shares of the matched initial sell orders and a total number of shares of the matched initial buy orders, the percentage being approximately equal to a ratio of a number of shares of the matched initial sell order to the total number of shares of the matched initial sell orders; and
for each of the matched initial buy orders, the processor apportioning to the matched initial buy order a percentage of the lesser of the total number of shares of the matched initial sell orders and the total number of shares of the matched initial buy orders, the percentage being approximately equal to a ratio of a number of shares of the matched initial buy order to the total number of shares of the matched initial buy orders.

6. The method of claim 1, further comprising:
for each of the matched further sell orders, the processor apportioning to the matched further sell order a percentage of the lesser of a total number of shares of the matched further sell orders and a total number of shares of the matched further buy orders, the percentage being approximately equal to a ratio of a number of shares of the matched further sell order to the total number of shares of the matched further sell orders; and
for each of the matched further buy orders, the processor apportioning to the matched further buy orders a percentage of the lesser of the total number of shares of the matched further sell orders and the total number of shares of the matched further buy orders, the percentage being approximately equal to a ratio of a number of shares of the matched further buy order to the total number of shares of the matched further buy orders;
wherein, residual portions of the matched initial buy orders and the matched initial sell orders are converted into further buy orders and further sell orders, respectively.

7. The method of claim 1, wherein the threshold volume is determined as a function of an average daily volume (ADV) of the security.

8. The method of claim 7, wherein the threshold volume is a function of a twenty day ADV of the security.

9. The method of claim 1, wherein the threshold volume is determined as a function of a market capitalization status of the security.

10. The method of claim 1, wherein a length of the time window is less than ten seconds.

11. The method of claim 1, wherein a length of the time window ranges from two to ten seconds.

12. A system for conducting computer-assisted transactions, comprising:
a central computer configured to:
receive from at least a subset of a plurality of system participants, initial orders to buy and sell a security;
match at least a subset of the initial buy orders to at least a subset of the initial sell orders based at least on quantity wherein an initial buy order of the at least the subset of the initial buy orders and an initial sell order of the at least the subset of the initial sell order are considered matched when there is at least a partial overlap between a quantity identified for sale by the initial sell order and the quantity identified for purchase by the initial buy order;
form an order block of at least a subset of the matched orders;
responsive to a threshold volume of matching orders being reached, broadcast a notification of cross (NOX) alert to each of the plurality of participants, the NOX alert indicating a beginning of a time window during which further matching orders to buy and sell quantities of the security, which are considered matched when they include a further sell order and a further buy order identifying respectively a quantity identified for sale and a quantity identified for purchase that at least partially overlap, are presentable for inclusion in the order block; and
at an end of the time window, execute the order block.

13. The system of claim 12, wherein the central computer is configured to execute the order block at the midpoint price of the National Best Bid and the National Best Offer (NBBO).

14. The system of claim 13, wherein the midpoint price is calculated from a value of the NBBO captured after the threshold volume is reached and before the NOX broadcast.

15. The system of claim 14, wherein the central computer is configured to:
- include the further matching orders in the order block in response to determining that the calculated midpoint price was within the NBBO at some time during the time window; and
- exclude the further matching orders from the order block in response to determining that the calculated midpoint price was not within the NBBO at any time during the time window.

16. The system of claim 12, wherein the central computer is configured to:
- for each of the matched initial sell orders, apportion to the matched initial sell order a percentage of the lesser of a total number of shares of the matched initial sell orders and a total number of shares of the matched initial buy orders, the percentage being approximately equal to a ratio of a number of shares of the matched initial sell order to the total number of shares of the matched initial sell orders; and
- for each of the matched initial buy orders, apportion to the matched initial buy order a percentage of the lesser of the total number of shares of the matched initial sell orders and the total number of shares of the matched initial buy orders, the percentage being approximately equal to a ratio of a number of shares of the matched initial buy order to the total number of shares of the matched initial buy orders.

17. The system of claim 12, wherein the central computer is configured to:
- for each of the matched further sell orders, apportion to the matched further sell order a percentage of the lesser of a total number of shares of the matched further sell orders and a total number of shares of the matched further buy orders, the percentage being approximately equal to a ratio of a number of shares of the matched further sell order to the total number of shares of the matched further sell orders; and
- for each of the matched further buy orders, apportion to the matched further buy orders a percentage of the lesser of the total number of shares of the matched further sell orders and the total number of shares of the matched further buy orders, the percentage being approximately equal to a ratio of a number of shares of the matched further buy order to the total number of shares of the matched further buy orders;

wherein, residual portions of the matched initial buy orders and the matched initial sell orders are converted into further buy orders and further sell orders, respectively.

18. The system of claim 12, wherein the threshold volume is determined as a function of an average daily volume (ADV) of the security.

19. The system of claim 18, wherein the threshold volume is a function of a twenty day ADV of the security.

20. The system of claim 12, wherein the threshold volume is determined as a function of a market capitalization status of the security.

21. The system of claim 12, wherein a length of the time window is less than ten seconds.

22. The system of claim 12, wherein a length of the time window ranges from two to ten seconds.

23. A method of a security transaction-assisting machine, comprising:
- matching, by a processor at a central computer, received buy orders to received sell orders with regard to a security, wherein the matched orders form an order block; and
- responsive to a threshold volume of matched orders being reached, the central computer broadcasting a notification of cross (NOX) alert, the NOX alert indicating a beginning of a time window during which further matching orders to buy and sell quantities of the security are presentable for inclusion in the order block.

24. A hardware-implemented computer-readable storage medium having stored thereon a series of instructions executable by a processor of a security transaction-assisting machine, the instructions which, when executed, cause the processor to perform a method, the method comprising:
- receiving from at least a subset of a plurality of system participants, initial orders to buy and sell a security;
- matching at least a subset of the initial buy orders to at least a subset of the initial sell orders based at least on quantity;
- forming an order block of at least a subset of the matched orders;
- responsive to a threshold volume of matching orders being reached, broadcasting a notification of cross (NOX) alert to each of the plurality of participants, the NOX alert indicating a beginning of a time window during which further matching orders to buy and sell quantities of the security are presentable for inclusion in the order block; and
- at an end of the time window, executing the order block.

* * * * *